(12) United States Patent
Okamura et al.

(10) Patent No.: US 11,700,059 B2
(45) Date of Patent: Jul. 11, 2023

(54) DISPLAY DEVICE AND RECEPTION TERMINAL

(71) Applicant: Panasonic Intellectual Property Management Co., Ltd., Osaka (JP)

(72) Inventors: Shutai Okamura, Osaka (JP); Masahiko Yamamoto, Osaka (JP); Toshihiro Ezaki, Osaka (JP); Satoshi Ohyama, Hyogo (JP); Takeshi Hatakeyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 277 days.

(21) Appl. No.: 16/769,490

(22) PCT Filed: Feb. 22, 2018

(86) PCT No.: PCT/JP2018/006329
§ 371 (c)(1),
(2) Date: Jun. 3, 2020

(87) PCT Pub. No.: WO2019/111421
PCT Pub. Date: Jun. 13, 2019

(65) Prior Publication Data
US 2020/0388212 A1    Dec. 10, 2020

(30) Foreign Application Priority Data
Dec. 4, 2017    (JP) .............................. JP2017-232229

(51) Int. Cl.
*G09G 3/3208*    (2016.01)
*G06T 7/70*    (2017.01)
(Continued)

(52) U.S. Cl.
CPC ......... *H04B 10/116* (2013.01); *G02F 1/0121* (2013.01); *G06T 7/70* (2017.01);
(Continued)

(58) Field of Classification Search
CPC ........... G09G 3/3208; G09G 2320/068; G09G 2320/0686; G09G 2354/00;
(Continued)

(56) References Cited

U.S. PATENT DOCUMENTS 7,174,130 B2    2/2007  Kurisko et al.
8,879,994 B2   11/2014  Brown et al.
(Continued)

FOREIGN PATENT DOCUMENTS

JP    9-327007    12/1997
JP    2011-9805    1/2011
(Continued)

OTHER PUBLICATIONS

International Search Report dated May 15, 2018 in corresponding International Application No. PCT/JP2018/006329.

*Primary Examiner* — Chanh D Nguyen
*Assistant Examiner* — Ngan T. Pham-Lu
(74) *Attorney, Agent, or Firm* — Wenderoth, Lind & Ponack, L.L.P.

(57) ABSTRACT

A display device includes imaging unit (101) to generate a captured image, image recognizer (102) to recognize whether or not the captured image contains a reception terminal, light emitter (106) to emit light in accordance with a modulation signal, and transmission controller (103) and light emission controller (105) to control driving of light emitter (106) based on a result recognized by image recognizer (102).

6 Claims, 23 Drawing Sheets

(51) Int. Cl.
*H04B 10/116* (2013.01)
*G02F 1/01* (2006.01)
*H04N 9/31* (2006.01)
*G06V 10/141* (2022.01)
*G06V 20/10* (2022.01)
*G06V 40/16* (2022.01)
*G06V 40/18* (2022.01)

(52) U.S. Cl.
CPC ............ *G06V 10/141* (2022.01); *G06V 20/10* (2022.01); *G06V 40/161* (2022.01); *G06V 40/18* (2022.01); *G09G 3/3208* (2013.01); *H04N 9/31* (2013.01); *G09G 2320/068* (2013.01); *G09G 2320/0686* (2013.01); *G09G 2354/00* (2013.01); *G09G 2358/00* (2013.01); *G09G 2370/18* (2013.01)

(58) Field of Classification Search
CPC .... G09G 2358/00; G06T 7/70; G06V 10/141; G06V 40/161; G06V 20/10; G02F 1/0121; H04B 10/116; H04N 9/31
See application file for complete search history.

(56) References Cited

U.S. PATENT DOCUMENTS

| | | | |
|---|---|---|---|
| 9,166,810 | B2 | 10/2015 | Oshima et al. |
| 9,185,735 | B2 | 11/2015 | Brown et al. |
| 9,467,802 | B2 | 10/2016 | Brown et al. |
| 2010/0073598 | A1* | 3/2010 | Masuda ............... G09G 3/3426 349/62 |
| 2010/0085374 | A1* | 4/2010 | Lee ...................... G09G 3/3426 345/589 |
| 2010/0245310 | A1* | 9/2010 | Hashimoto .......... G09G 3/3406 345/207 |
| 2012/0206391 | A1* | 8/2012 | Kim ................... H04M 1/72412 345/173 |
| 2012/0208466 | A1* | 8/2012 | Park .................... H04N 21/4108 455/41.3 |
| 2015/0010308 | A1* | 1/2015 | Uedaira ............... H04B 10/116 398/106 |
| 2016/0270195 | A1 | 9/2016 | Ikehara et al. |

FOREIGN PATENT DOCUMENTS

| | | |
|---|---|---|
| JP | 2015-15569 | 1/2015 |
| JP | 2016-167385 | 9/2016 |

\* cited by examiner

DISPLAY DEVICE AND RECEPTION TERMINAL

This application is a U.S. national stage application of the PCT International Application No. PCT/JP2018/006329 filed on Feb. 22, 2018, which claims the benefit of foreign priority of Japanese patent application No. 2017-232229 filed on Dec. 4, 2017, the contents all of which are incorporated herein by reference.

TECHNICAL FIELD

The present disclosure relates to a display device that is equipped with a light emitter and that is designed to send information by controlling light emitted from the light emitter. The disclosure also relates to a reception terminal that receives such information.

BACKGROUND ART

In recent years, mobile personal terminals such as smartphones and tablet terminals have become widespread rapidly, and users of personal terminals can enjoy viewing websites, listening to music, and so on anytime, anywhere. At present, smartphones, tablet terminals, and other personal terminals feature a function of connecting with external devices as standard equipment. Thus, a user, for example, can carry the user's personal terminal on a conveyance such as an automobile or an airplane and connect the personal terminal to a display device equipped in the conveyance such as an automobile or an airplane via Bluetooth (registered trademark; hereinafter the similar is applied) or other connection means to let the connected device and terminal work in conjunction with each other.

Pairing the display device with the personal terminal via Bluetooth necessitates exchanging authentication information between the display device and the personal terminal. A common method requires the user to perform complicated work involving selecting one display device that the user wants the personal terminal to be paired with from a list of a plurality of display devices displayed on a screen of the personal terminal and entering predetermined data such as a four-digit number. A way of conveying the predetermined data to the user of the personal terminal is a method of displaying a four-digit number on the screen of the display device.

A conventional information communication method is disclosed (refer to, for example, PTL 1). The method involves sending a pulse train containing a predetermined data string as an optical modulation signal from a light-emitting diode (LED) used as a backlight in an LED illuminator or a liquid crystal display (LCD) and receiving the optical modulation signal by an imaging device incorporated in a reception terminal such as a mobile phone.

CITATION LIST

Patent Literature

PTL 1: U.S. Pat. No. 9,166,810

SUMMARY OF THE INVENTION

Assuming that information necessary for pairing the display device and the personal terminal is exchanged using the information communication method described in PTL 1, the following problems exist.

For instance, several hundred display devices incorporating LCDs are installed in many types of airplanes, in particular of conveyances. Thus, if a passenger directs an imaging device of the passenger's reception terminal toward a display device at his/her seat, the reception terminal may receive an optical modulation signal emitted from a display device at a seat next to his/her seat. There is also a danger that a third person may deliberately try to receive an optical modulation signal emitted from a display device at a seat next to the third person's seat. Hence, a display device for a passenger is required to send an optical modulation signal only to a reception terminal intended by the passenger.

The present disclosure provides a display device designed to send information to a reception terminal with which a user intends to receive an optical modulation signal, as well as a reception terminal designed to receive information sent from such a display device.

A display device according to an aspect of the present disclosure includes an imaging unit to generate a captured image, an image recognizer to recognize whether or not the captured image contains a reception terminal, a light emitter to emit light in accordance with a modulation signal, and a controller to control driving of the light emitter based on a result recognized by the image recognizer.

This configuration allows the display device to emit an optical modulation signal from the light emitter only if a reception terminal with which a user intends to receive the optical modulation signal is present and avoid transmission of information if such a reception terminal is absent.

The present disclosure can provide a display device designed to send information to a reception terminal with which a user intends to receive an optical modulation signal, as well as a reception terminal designed to receive information sent from such a display device.

DESCRIPTION OF EMBODIMENTS

Exemplary embodiments are described in detail below with reference to the drawings as appropriate. However, an unnecessarily detailed description may be omitted. For example, a detailed description of well-known matters or a duplicate description of substantially the same configuration may be omitted. This is to avoid unnecessary redundancy in the description below and to make the description below easily understandable to those skilled in the art.

The accompanying drawings and the following description are provided to enable those skilled in the art to fully know the present disclosure and are not intended to limit the matters described in the claims.

First Exemplary Embodiment

Figure 1:
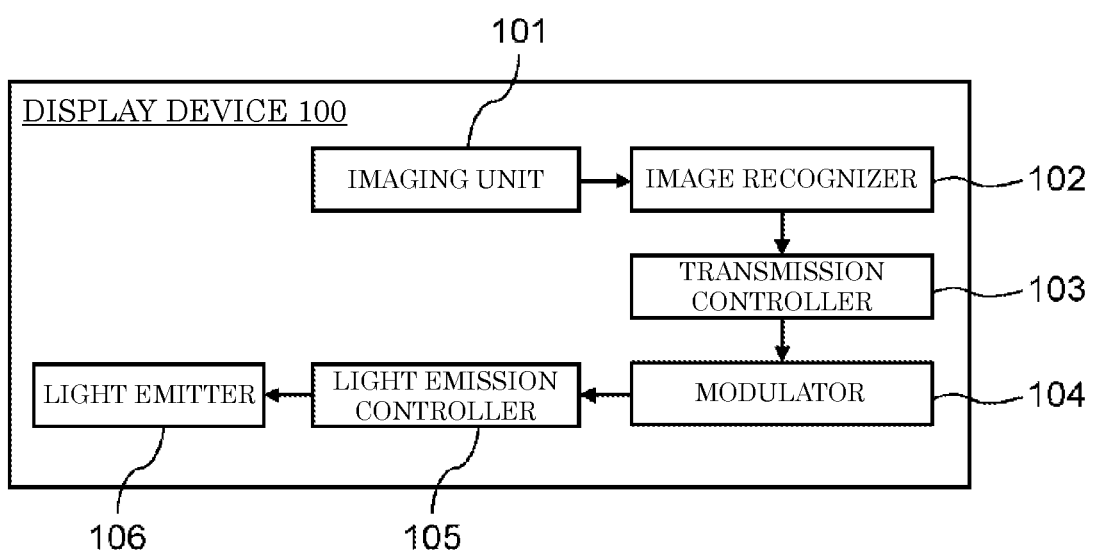
FIG. 1 is a block diagram illustrating a configuration of display device 100 according to a first exemplary embodiment.

A first exemplary embodiment will now be described with reference to FIGS. 1 to 10.
[1-1. Configuration]
FIG. 1 is a block diagram illustrating a configuration of display device 100 according to a first exemplary embodiment.

Display device 100 includes imaging unit 101, image recognizer 102, transmission controller 103, modulator 104, light emission controller 105, and light emitter 106. Display device 100 is, for example, a seat back monitor that is installed on a back of each seat in an airplane and that can be operated by a passenger sitting on each seat. Although FIG. 1 illustrates transmission controller 103 and light emission controller 105 as separate components, transmission controller 103 and light emission controller 105 may be united and be simply referred to as a controller.

Imaging unit 101 is a camera that images a subject and generates a captured image. For instance, imaging unit 101 images a person sitting on a seat in an airplane and an object around the seat. Imaging unit 101 outputs the captured image to image recognizer 102. Imaging unit 101 and light emitter 106, which is described later, are provided on an identical surface (e.g., provided on a display surface) of display device 100.

Image recognizer 102 recognizes whether the captured image generated by imaging unit 101 contains a person and an object and recognizes states of the person and the object. For instance, image recognizer 102 analyzes the captured image and recognizes presence or absence of an object equipped with an imaging device, such as a mobile phone, a smartphone, or a tablet terminal, as well as the state and a position of the object. Image recognizer 102 then outputs a result of recognition to transmission controller 103.

Based on the result recognized by image recognizer 102, transmission controller 103 controls operation of modulator 104.

Modulator 104 modulates transmission data made up of a predetermined bit sequence into a pulse train.

Based on the pulse train that makes up a modulation signal and that is generated by modulator 104, light emission controller 105 controls light emitted from light emitter 106.

Light emitter 106 is, for example, an LED, a liquid crystal monitor, or an organic electroluminescent (EL) monitor. Light emitter 106 outputs optical modulation signals in accordance with control by light emission controller 105.
[1-2. Operation]
An operation of display device 100 configured as described above is described below.

Figure 2:
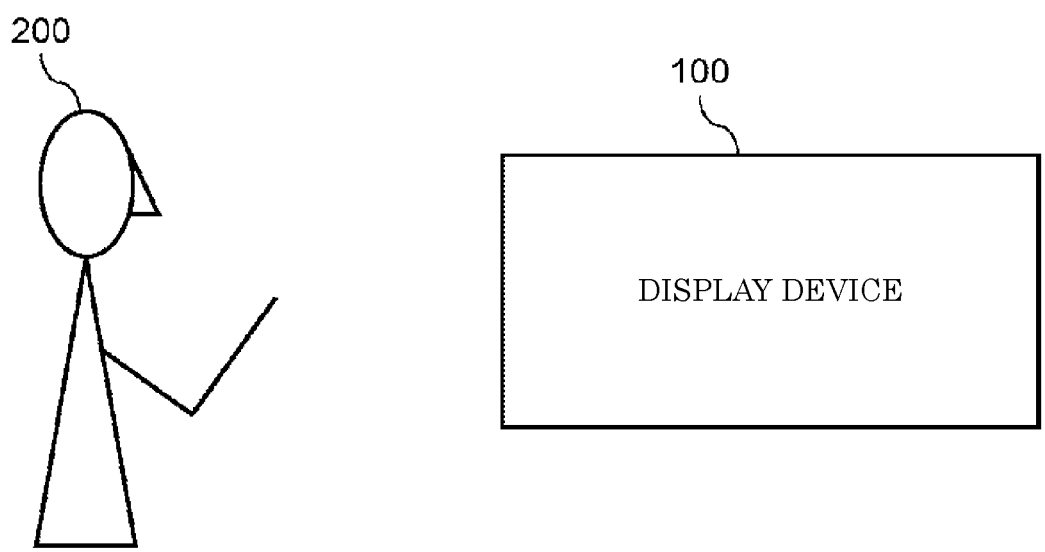
FIG. 2 is a drawing illustrating a relationship between a user and the display device according to the first exemplary embodiment.

FIG. 2 is a drawing illustrating a relationship between display device 100 and user 200 who uses display device 100. Optical modulation signals sent by display device 100 can be received by a mobile phone or another terminal including an imaging device (an imaging unit), for example. Such a terminal will be hereinafter described as a reception terminal.

Figure 3:
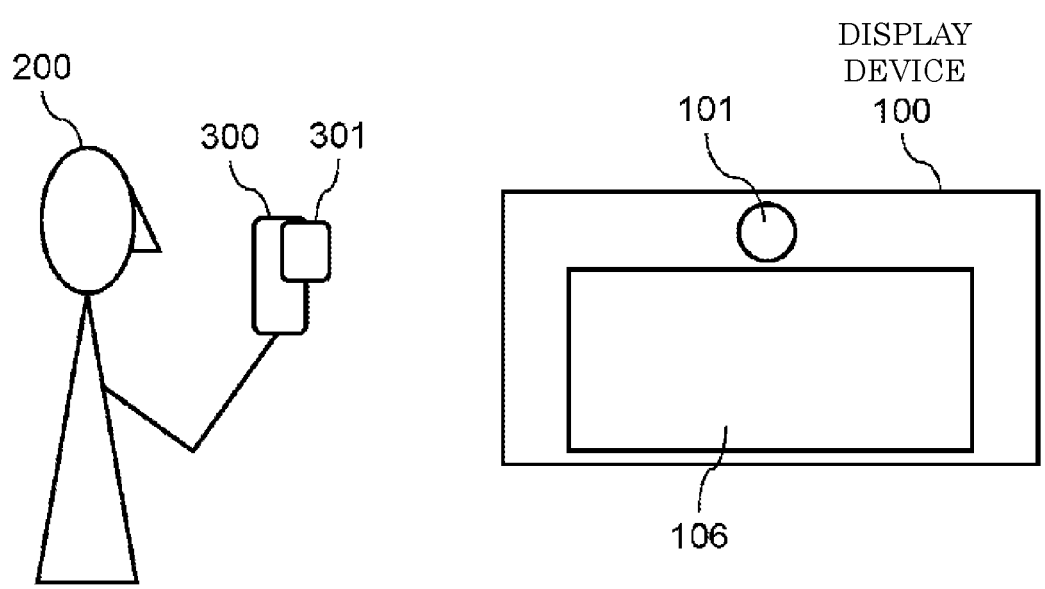
FIG. 3 is a drawing illustrating a relationship between the user and the display device according to the first exemplary embodiment.

FIG. 3 is a drawing illustrating user 200 holding reception terminal 300 ready to receive an optical modulation signal sent from display device 100. Reception terminal 300 includes imaging unit 301. The reception terminal is held by user 200, with imaging unit 301 facing light emitter 106 of display device 100.

Display device 100 transmits an optical modulation signal only if a reception terminal with which a user intends to receive the modulation signal is present. The operation of display device 100 will now be described in detail.

Prior to the start of transmitting an optical modulation signal, display device 100 checks whether or not reception terminal 300 is present in front of display device 100.

Specifically, first, imaging unit 101 of display device 100 images a subject and generates a captured image. Imaging unit 101 sends the captured image to image recognizer 102.

Figure 4:
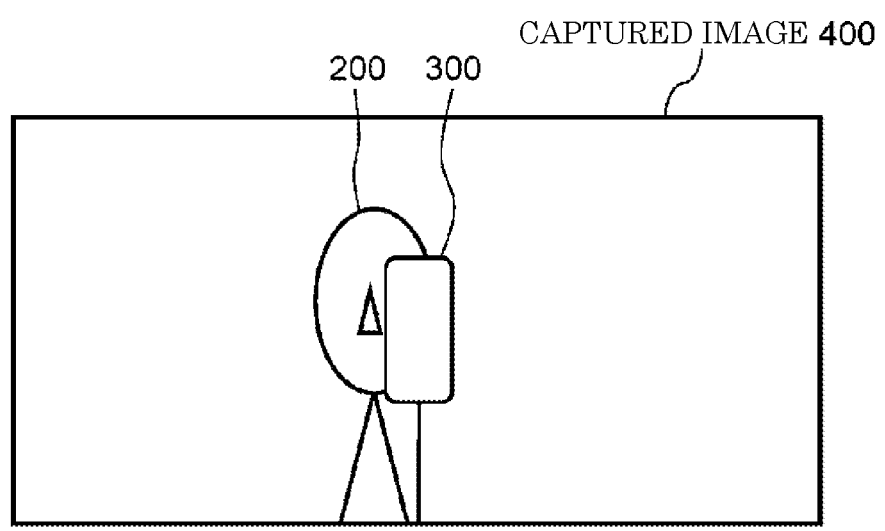
FIG. 4 is a drawing illustrating an example of a captured image generated by imaging unit 101 according to the first exemplary embodiment.

Next, image recognizer 102 executes a process for recognizing an object contained in the captured image and a position of the object in the image. FIG. 4 illustrates an example of the captured image generated by imaging unit 101.

For instance, in captured image 400 shown in FIG. 4, user 200 holds reception terminal 300. Reception terminal 300 is positioned in a middle of captured image 400, and reception terminal 300 faces display device 100. Image recognizer 102 executes a process for recognizing an image, i.e., captured image 400 and thereby recognizes that reception terminal 300 is positioned in the middle of captured image 400. In other words, image recognizer 102 determines that reception terminal 300 with which the user intends to receive an optical modulation signal is present in front of display device 100.

Meanwhile, if any reception terminal is not recognized in the captured image, image recognizer 102 determines that no reception terminal is present.

Figure 5:
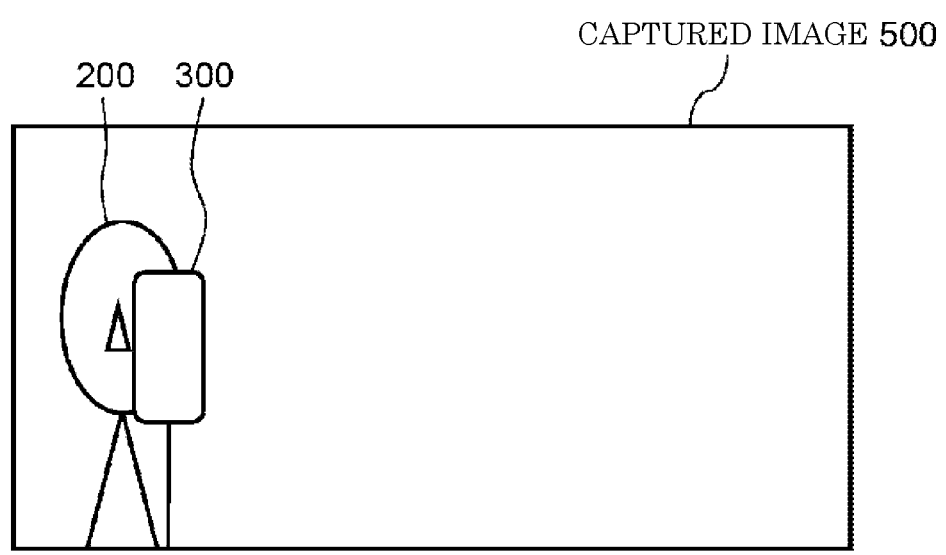
FIG. 5 is a drawing illustrating an example of a captured image generated by imaging unit 101 according to the first exemplary embodiment.

FIG. 5 is a drawing illustrating reception terminal 300 that is not in a middle of captured image 500 but is positioned at an end (a right end or a left end) of the captured image. In a case of the positional relationship shown in FIG. 5, image recognizer 102 determines that the user with reception terminal 300 does not intend to receive an optical modulation signal from display device 100. As a result, image recognizer 102 determines that a reception terminal with which the user intends to receive an optical modulation signal is not present in captured image 500. This example may be a conceivable case in which user 200 contained in captured image 500 is a user of a display device at an adjacent seat who is trying to receive an optical modulation signal from the display device at the adjacent seat.

Image recognizer 102 sends a result of the determination of the existence (presence or absence) of a reception terminal and the position of the reception terminal in the captured image to transmission controller 103.

Next, an operation performed by transmission controller 103 in response to receiving a result indicating the "presence" of a reception terminal from image recognizer 102 is described. In this case, transmission controller 103 transmits a request signal to modulator 104 to ask for the start of generation of a modulation signal containing predetermined data.

In response to the request signal from transmission controller 103, modulator 104 generates a modulation signal by modulating the predetermined data into a pulse train. The predetermined data includes a series of information unique to each display device, a control signal used to inform reception terminal 300 about information such as start and end of optical modulation signal transmission and an amount of transmission data, a redundant signal used to detect or correct an error, a control signal used for pulse train synchronization, and flight-related information such as a seat number, a flight number, and an airline. Modulator 104 transmits the generated modulation signal to light emission controller 105.

In accordance with the modulation signal sent from modulator 104, light emission controller 105 controls driving of light emitter 106. Light emission controller 105 performs control so as to let light emitter 106 emit light when pulses that make up the modulation signal are high and let light emitter 106 turn off light when pulses that make up the modulation signal are low. Because of this, light emitted from light emitter 106 has an optical intensity in proportion to a train of pulses that make up the modulation signal. As a result, an optical modulation signal is sent from light emitter 106.

Imaging unit 301 of reception terminal 300 receives the optical modulation signal sent from light emitter 106 of display device 100 and executes a predetermined process set by an application.

Meanwhile, an operation performed by transmission controller 103 in response to receiving a result indicating the "absence" of a reception terminal from image recognizer 102 is described. The operation is branched according to conditions.

(1) A situation in which the transmission controller receives a result indicating the "absence" of a reception terminal while display device 100 is outputting an optical modulation signal In this case, transmission controller 103 first transmits a request signal to modulator 104 to ask for the stop of modulation signal generation. Then, in response to the request signal from transmission controller 103, modulator 104 stops the generation of a modulation signal containing predetermined data and the output of the modulation signal to light emission controller 105. This consequently stops transmission of the optical modulation signal from light emitter 106. Even if modulator 104 has stopped the generation of the modulation signal, modulator 104 may generate a pulse train in the form of not containing predetermined data, e.g., modulation signal pulses with a pulse width having a predetermined duty cycle, and send the generated pulse train to light emission controller 105. This enables light emitter 106 to emit light even if no optical modulation signal is transmitted. The display device may include another drive circuit to allow light emitter 106 to emit light during no transmission of optical modulation signals.

(2) A situation in which the transmission controller receives a result indicating the "absence" of a reception terminal while display device 100 is transmitting no optical modulation signals In this case, transmission controller 103 does not transmit the request signal described above to modulator 104. This maintains light emitter 106 in a state in which the light emitter is transmitting no optical modulation signals. In one example of implementation of control, transmission controller 103 may transmit a request signal to modulator 104 to ask for the stop of modulation signal generation. This can also maintain light emitter 106 in a state in which the light emitter is transmitting no optical modulation signals.

[1-3. Effects and Others]

As described above, in the present exemplary embodiment, display device 100 is able to control transmission of optical modulation signals in response to the presence or absence of a reception terminal with which a user intends to receive a modulation signal from display device 100.

This allows display device 100 to prevent unintentional transmission of optical modulation signals and avoid communication with receptions terminals other than the reception terminal of the user of display device 100.

[1-4. Example Applications]

Figure 6:
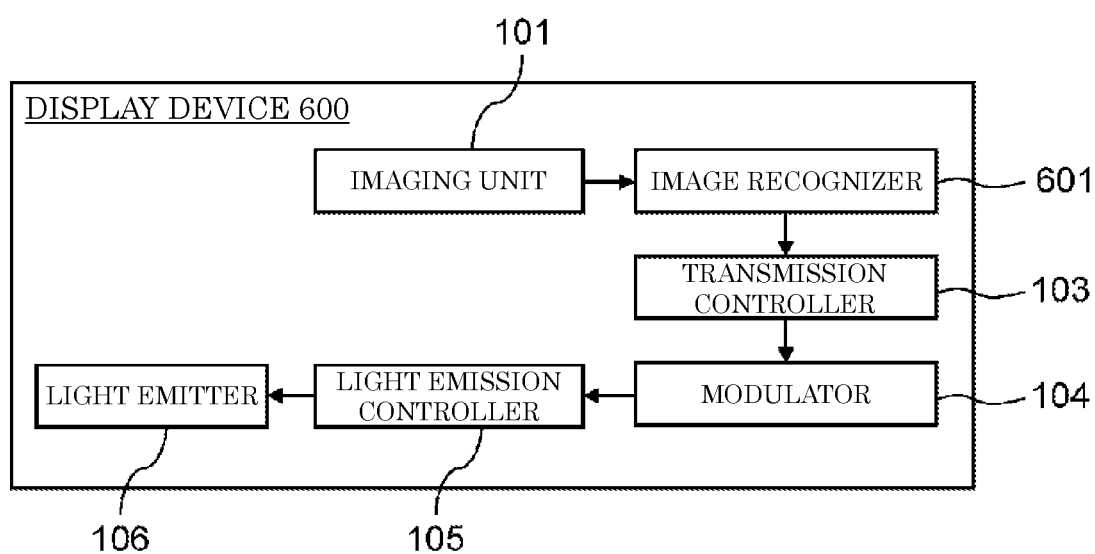
FIG. 6 is a block diagram illustrating a configuration of display device 600 according to the first exemplary embodiment.
Figure 7:
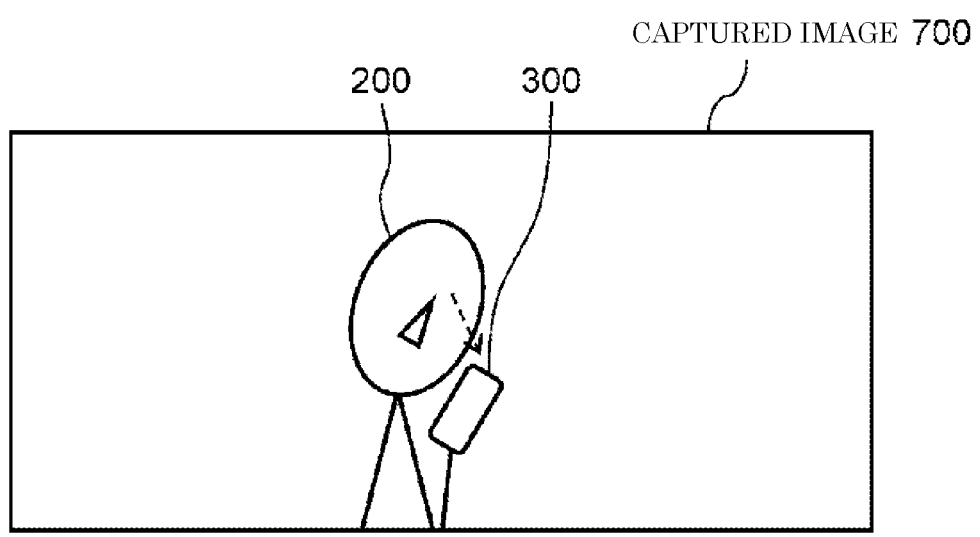
FIG. 7 is a drawing illustrating an example of a captured image generated by imaging unit 101 according to the first exemplary embodiment.

As an example of another configuration of the present exemplary embodiment, display device 600, as shown in FIG. 6, may include image recognizer 601 that further has a state recognition function. In addition to recognizing presence or absence of a person and an object and a position of the person and the object in a captured image generated by imaging unit 101, image recognizer 601 recognizes a state of the person and the object. For instance, if image recognizer 601 acquires captured image 700 show in FIG. 7, image recognizer 601 recognizes that user 200 and reception terminal 300 are positioned at a front of display device 600. Further, image recognizer 601 recognizes a state of reception terminal 300 based on a gaze direction and a body orientation of user 200 as well as an angle of reception terminal 300. In an instance of captured image 700, image recognizer 601, based on the gaze direction of user 200 and the angle of reception terminal 300, recognizes that user 200 is in a middle of an action other than reception of an optical modulation signal. In other words, image recognizer 601 determines that reception terminal 300 is not in a state where the user intends to receive an optical modulation signal.

Then, image recognizer 601 sends a result indicating the "absence" of a reception terminal to transmission controller 103.

Figure 8:
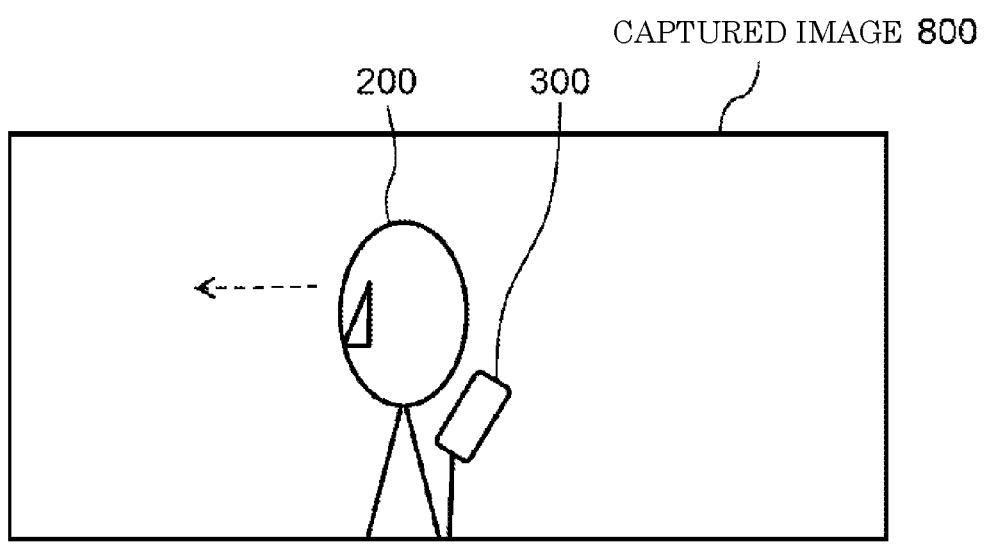
FIG. 8 is a drawing illustrating an example of a captured image generated by imaging unit 101 according to the first exemplary embodiment.

In another instance, if image recognizer 601 receives captured image 800 shown in FIG. 8, image recognizer 601, based on detection of a gaze direction of user 200, determines that user 200 is in a middle of an action other than the reception of an optical modulation signal from display device 600. The image recognizer then sends a result indicating the "absence" of a reception terminal to transmission controller 103.

Thus, display device 600 is able to control transmission of optical modulation signals in consideration of a situation in which the user and the reception terminal are (e.g., the gaze direction and face orientation of the person and whether or not the reception terminal is ready to receive modulation signals), as well as by recognizing whether or not the user and the reception terminal are present in front of display device 600. This allows display device 600 to prevent unintentional transmission of optical modulation signals.

Figure 9:
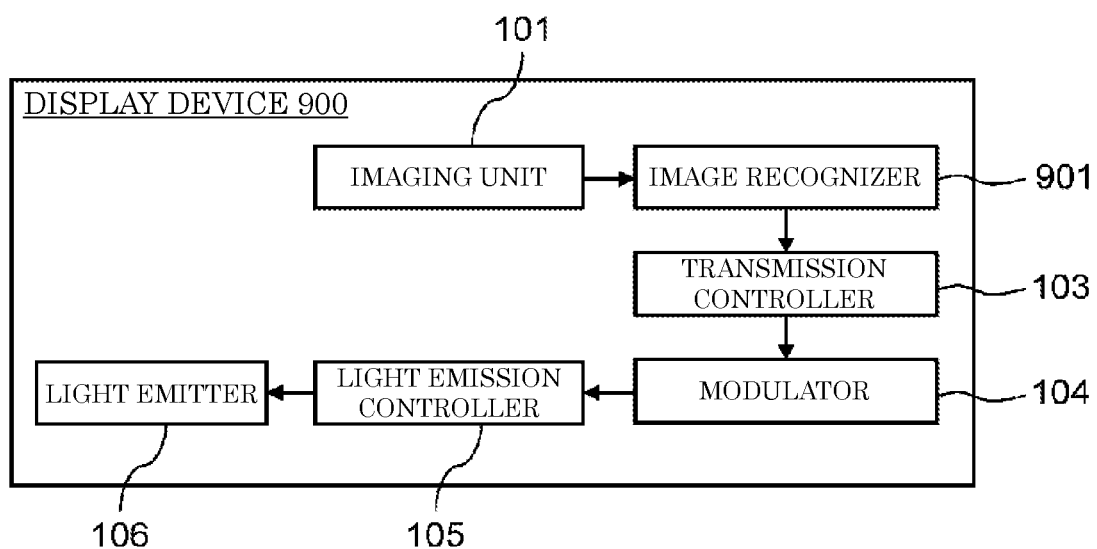
FIG. 9 is a block diagram illustrating a configuration of display device 900 according to the first exemplary embodiment.

As an example of another configuration of the present exemplary embodiment, display device 900, as shown in FIG. 9, may include image recognizer 901 that further has a feeling recognition function. In addition to recognizing presence or absence of a person and an object and a position of the person and the object in a captured image generated by imaging unit 101, image recognizer 901 recognizes the person's feeling if the person is contained in the image. For instance, if image recognizer 901 acquires captured image 1000 show in FIG. 10, image recognizer 901 recognizes that user 200 and reception terminal 300 are positioned at a front of display device 600. Further, image recognizer 901 recognizes user 200's feeling based on information about user 200 such as a slight change in facial expression and look, a degree of opening of eyelids, and a number of blinks.

Figure 10:
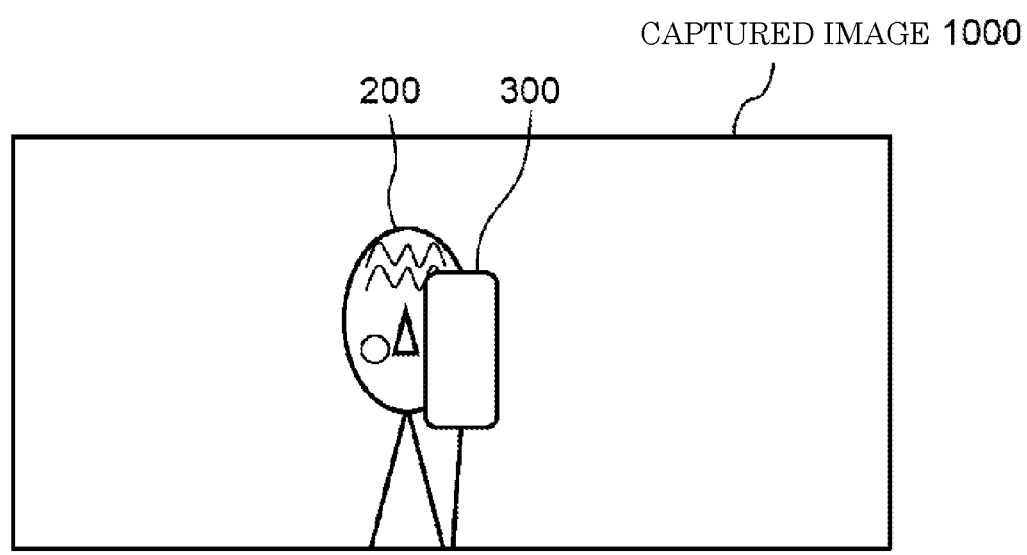
FIG. 10 is a drawing illustrating an example of a captured image generated by imaging unit 101 according to the first exemplary embodiment.

Captured image 1000 in FIG. 10 shows an example situation in which user 200 feels dissatisfied. In one example, user 200 feels dissatisfied if display device 900 does not transmit optical modulation signals despite the presence of a reception terminal with which the user intends to receive an optical modulation signal. Image recognizer 901, based on a slight change in user 200's facial expression and look, determines that user 200 is dissatisfied with being unable to receive an optical modulation signal and sends a result indicating the "presence" of a reception terminal to transmission controller 103. In this way, even if display device 900 is in an erroneous state in which no optical modulation signal is transmitted despite the presence of a reception terminal, display device 900 is allowed to recover from that state. Such an erroneous state can be created when display device 900, for example, determines that no reception terminal is present because of user 200 temporarily looking in a direction other than toward display device 900 and immediately after that, user 200 is looking back at display device 900.

Thus, display device 900 is able to control transmission of optical modulation signals in consideration of the user's feelings, as well as by recognizing whether or not the user and the reception terminal are present in front of display device 900. This enables display device 900 to recover from the erroneous state if the display device is in that state, as well as to prevent unintentional transmission of optical modulation signals.

Second Exemplary Embodiment

A second exemplary embodiment will now be described with reference to FIGS. 11 to 13. In the following description, components that have already been described will be denoted by the same numerals or symbols, and descriptions thereof will be omitted.

[2-1. Configuration]

Figure 11:
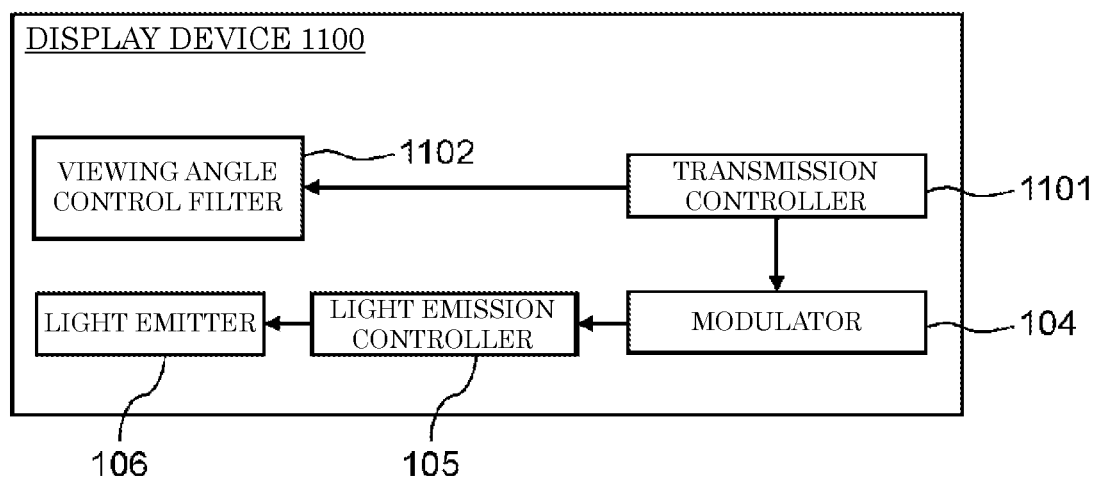
FIG. 11 is a block diagram illustrating a configuration of display device 1100 according to a second exemplary embodiment.

FIG. 11 is a block diagram illustrating a configuration of display device 1100 according to a second exemplary embodiment. Display device 1100 includes transmission controller 1101, viewing angle control filter 1102, modulator 104, light emission controller 105, and light emitter 106. Although not illustrated, a display, a component of display device 1100, has light emitter 106.

Transmission controller 1101 controls start and stop of transmission of optical modulation signals. Transmission controller 1101 also controls operation of viewing angle control filter 1102 depending on whether or not an optical modulation signal is transmitted.

Viewing angle control filter 1102 is a filter used to change a viewing angle of the display incorporated in display device 1100. If viewing angle control filter 1102 limits the viewing angle, an image displayed on the display by display device 1100 can be seen by a user who is present in front of display device 1100 but cannot be seen by a user who is not present in front of the display device and is, for example, sitting on an adjacent seat. Viewing angle control filter 1102 changes the viewing angle in response to a request from transmission controller 1101.

[2-2. Operation]

First, while display device 1100 is transmitting no optical modulation signal, transmission controller 1101 does not limit the viewing angle of the display through viewing angle control filter 1102.

While display device 1100 is transmitting an optical modulation signal, transmission controller 1101 limits the viewing angle of the display through viewing angle control filter 1102 as follows.

First, when display device 1100 starts transmitting an optical modulation signal, transmission controller 1101 requests modulator 104 to generate a modulation signal containing predetermined data. Next, in conformance with the request from transmission controller 1101, modulator 104 modulates a series of information containing the predetermined data into a pulse train and sends the pulse train to light emission controller 105. Next, in accordance with the modulation signal sent from modulator 104, light emission controller 105 controls driving of light emitter 106. Light emission controller 105 performs control so as to let light emitter 106 emit light when pulses that make up the modulation signal are high and let light emitter 106 turn off light when pulses that make up the modulation signal are low. Because of this, light emitted from light emitter 106 has an optical intensity in proportion to a train of pulses that make up the modulation signal. As a result, an optical modulation signal is sent from light emitter 106.

Transmission controller 1101 also transmits a request signal to viewing angle control filter 1102 to ask for limitation of the viewing angle. In response to the request signal from transmission controller 1101, viewing angle control filter 1102 decreases the viewing angle of the display. Light produced by light emitter 106 is emitted to an outside of display device 1100 through viewing angle control filter 1102. Thus, a range within which the optical modulation signal sent from display device 1100 reaches is limited to inside the viewing angle limited by viewing angle control filter 1102.

Figure 12:
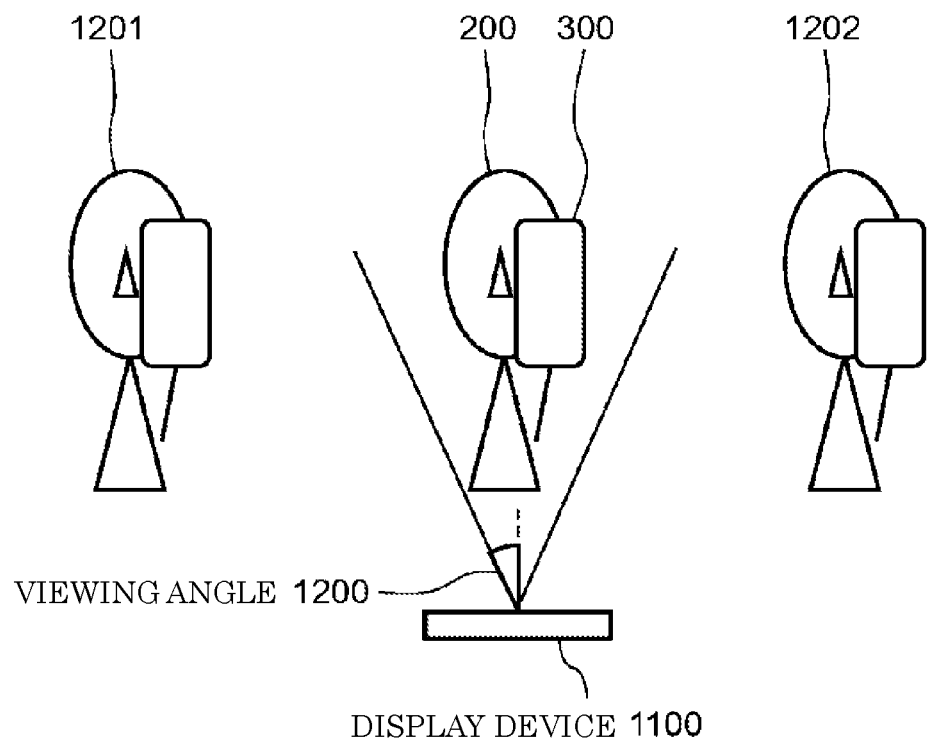
FIG. 12 is a drawing illustrating a relationship between users and the display device according to the second exemplary embodiment.

FIG. 12 illustrates an example of a relationship between users and the display device. User 200 intends to receive an optical modulation signal from display device 1100. User 200 is present in front of display device 1100, holding reception terminal 300. Users 1201 and 1202 do not intend to receive optical modulation signals from display device 1100. Users 1201 and 1202 are present on left and right sides of user 200. Display device 1100 controls viewing angle 1200 of the display through viewing angle control filter 1102 and thereby limits the range within which the optical modulation signal reaches to only a vicinity of user 200.

[2-3. Effects and Others]

As described above, in the present exemplary embodiment, display device 1100 includes transmission controller 1101 and viewing angle control filter 1102 and thus can limit the range within which the optical modulation signal reaches.

This configuration allows display device 1100 to prevent transmission of optical modulation signals to unintended reception terminals.

[2-4. Example Applications]

Figure 13:
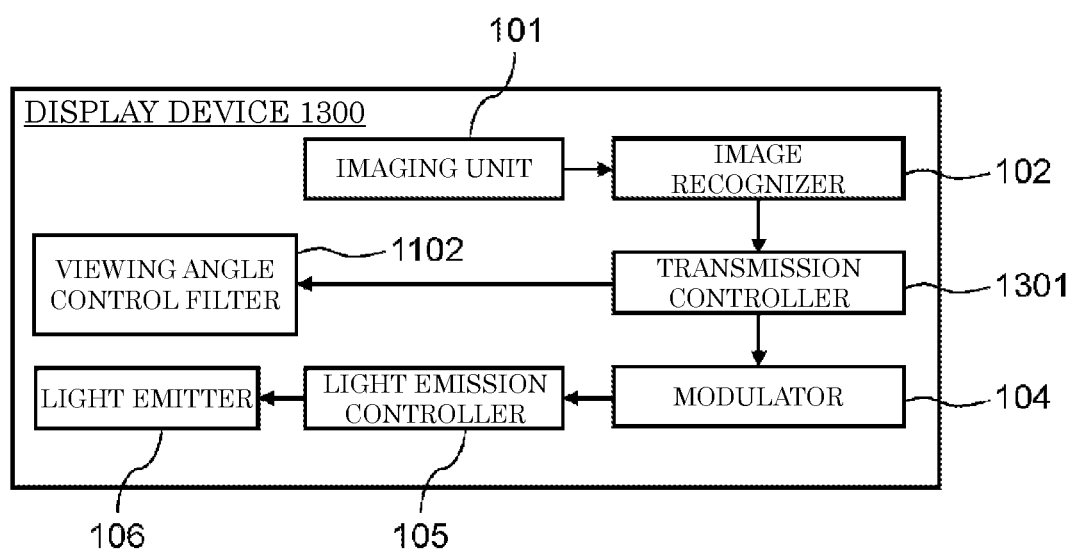
FIG. 13 is a block diagram illustrating a configuration of display device 1300 according to the second exemplary embodiment.

As an example of another configuration of the present exemplary embodiment, display device 1300, as shown in FIG. 13, may further include imaging unit 101, image recognizer 102, and transmission controller 1301. Imaging unit 101 and image recognizer 102 have configurations and functions similar to those described in the first exemplary embodiment.

Image recognizer 102 determines whether or not a reception terminal with which the user intends to receive an optical modulation signal is present in the captured image and sends a result of the determination to transmission controller 1301.

Transmission controller 1301 controls start and stop of transmission of optical modulation signals based on the determination result sent from image recognizer 102. The rest of the operation is similar to that of display device 1100 and thus a description thereof is omitted.

As described above, display device 1300 is designed to start transmission of an optical modulation signal in response to the presence of a reception terminal with which the user intends to receive the optical modulation signal from display device 1300 and transmit the optical modulation signal to only a vicinity of a place where the reception terminal is present.

This configuration allows display device 1300 to prevent transmission of optical modulation signals to unintended reception terminals.

Third Exemplary Embodiment

A third exemplary embodiment will now be described with reference to FIGS. 14 to 18. In the following description, components that have already been described will be denoted by the same numerals or symbols, and descriptions thereof will be omitted.

[3-1. Configuration]

Figure 14:
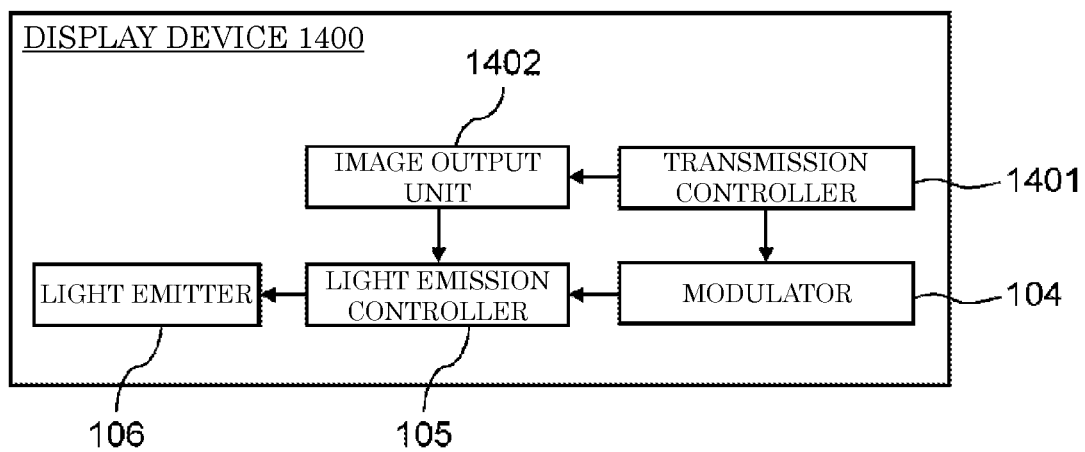
FIG. 14 is a block diagram illustrating a configuration of display device 1400 according to a third exemplary embodiment.

FIG. 14 is a block diagram illustrating a configuration of display device 1400 according to a third exemplary embodiment. Display device 1400 includes transmission controller 1401, image output unit 1402, modulator 104, light emission controller 105, and light emitter 106. Although not illustrated, a display, a component of display device 1400, has light emitter 106 and shows an image selected by image output unit 1402.

Transmission controller 1401 controls start and stop of transmission of optical modulation signals. Transmission controller 1401 also controls operation of image output unit 1402 depending on whether or not an optical modulation signal is transmitted.

Image output unit 1402 selects an image that is to be shown on the display incorporated in display device 1400 and outputs the image. In response to a request from transmission controller 1401, image output unit 1402 changes the output image.

[3-2. Operation]

When display device 1400 starts transmitting an optical modulation signal, transmission controller 1401 requests modulator 104 to generate a modulation signal containing predetermined data. In conformance with the request from transmission controller 1401, modulator 104 modulates a series of information containing the predetermined data into a pulse train and sends the pulse train to light emission controller 105. In accordance with the modulation signal sent from modulator 104, light emission controller 105 controls driving of light emitter 106. Light emission controller 105 performs control so as to let light emitter 106 emit light when pulses that make up the modulation signal are high and let light emitter 106 turn off light when pulses that make up the modulation signal are low. Because of this, light emitted from light emitter 106 has an optical intensity in proportion to a train of pulses that make up the modulation signal. As a result, an optical modulation signal is sent from light emitter 106.

At the start of transmission of the optical modulation signal, transmission controller 1401 transmits a request signal to image output unit 1402 to ask for selection of an output image. In response to the request signal from transmission controller 1401, image output unit 1402 selects an output image (a specific image) that is to be shown on the display during transmission of the optical modulation signal and outputs the image. In one example, output image 1500 shown in FIG. 15 may be used. Output image 1500 is an image that includes high-brightness zone 1501 and low-brightness zone 1502. Brightness is higher than a predetermined level in a middle zone of the image and is lower than the predetermined level in a peripheral zone of the image. Generally, light emitted from high-brightness zone 1501 has high intensity, whereas light emitted from low-brightness zone 1502 has low intensity. A range and a distance within which optical modulation signals transmitted from display device 1400 reach are proportional to intensity of light emitted from light emitter 106. Hence, display device 1400 is able to transmit optical modulation signals only to a reception terminal that can image the middle zone of output image 1500. Meanwhile, the display device is able to limit to transmit optical modulation signals to a reception terminal that images the peripheral zone of output image 1500 rather than the middle zone of output image 1500. Such reception terminal is positioned at, for example, a seat adjacent to the seat at which display device 1400 is installed.

A composition of the image is not limited to uniform colors of white and black as shown in output image 1500. The image may have a color primarily composed of a high-brightness color such as white, yellow, or red in the middle zone and a color primarily composed of a low-brightness color such as black, brown, or dark gray in the peripheral zone.

[3-3. Effects and Others]

As described above, in the present exemplary embodiment, display device 1400 includes transmission controller 1401 and image output unit 1402 and thus can limit the range within which the optical modulation signal reaches.

This configuration allows display device 1400 to prevent transmission of optical modulation signals to unintended reception terminals.

[3-4. Example Applications]

Figure 16:
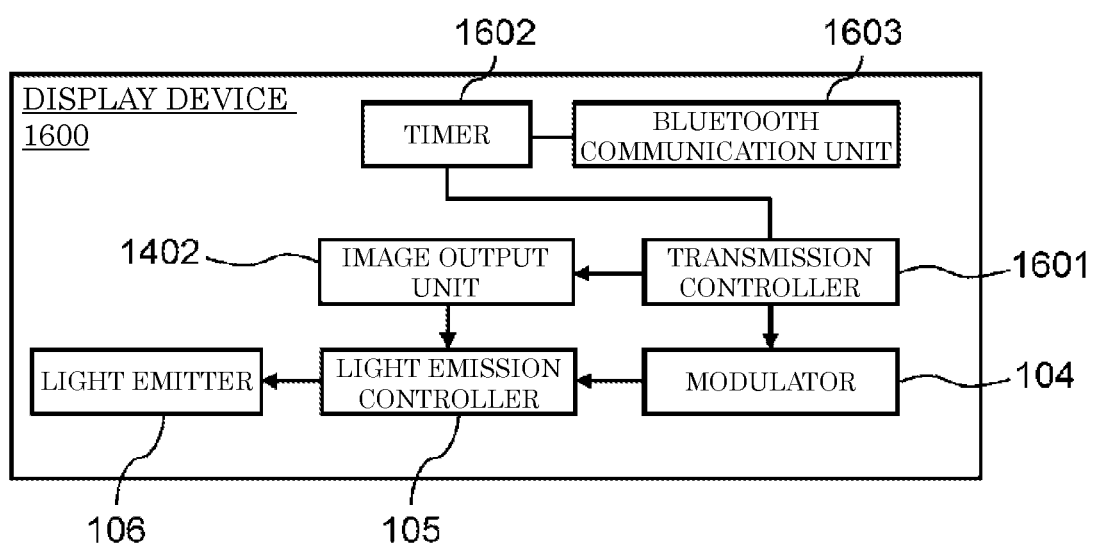
FIG. 16 is a block diagram illustrating a configuration of display device 1600 according to the third exemplary embodiment.
Figure 17:
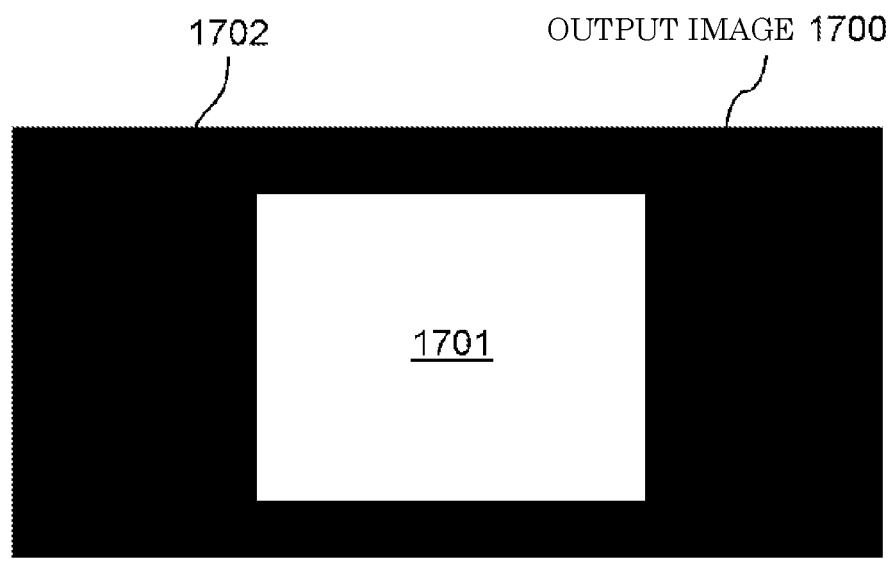
FIG. 17 is a drawing illustrating an example of an output image according to the third exemplary embodiment.

As an example of another configuration of the present exemplary embodiment, display device 1600, as shown in FIG. 16, may further include transmission controller 1601, timer (measuring unit) 1602, and Bluetooth (registered trademark) communication unit 1603. A reception terminal is configured to start Bluetooth communication with display device 1600 in response to proper reception of an optical modulation signal from display device 1600.

In addition to the function that transmission controller 1401 of display device 1400 has, transmission controller 1601 has a function of requesting image output unit 1402 to change the output image based on information sent from timer 1602. Timer 1602 measures time that has elapsed from a point of time at which transmission controller 1601 requests the start of transmission of an optical modulation signal (a point of time at which light emitter 106 starts driving in accordance with the optical modulation signal).

Bluetooth communication unit 1603 is a communication module used to perform Bluetooth communication.

Figure 15:
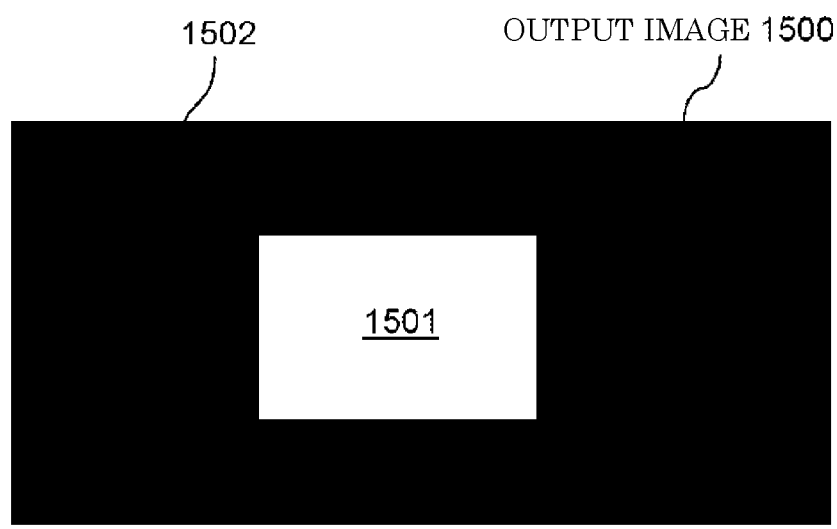
FIG. 15 is a drawing illustrating an example of an output image according to the third exemplary embodiment.

Assuming that display device 1600 is transmitting an optical modulation signal while displaying output image 1500 shown in FIG. 15, the following description is given.

At a point of time when display device 1600 starts transmitting an optical modulation signal, Bluetooth communication unit 1603 and the reception terminal are not paired with each other. Timer 1602 measures time that has elapsed from a point of time at which display device 1600 starts transmitting an optical modulation signal (a point of time at which light emitter 106 starts driving in accordance with the optical modulation signal). When the reception terminal has correctly completed the reception of the optical modulation signal and a Bluetooth communication unit incorporated in the reception terminal has been completely paired with Bluetooth communication unit 1603 of display device 1600, Bluetooth communication unit 1603 sends notification of the completion of the pairing to timer 1602. Timer 1602 notifies transmission controller 1601 of the completion of the pairing (i.e., establishment of communication). In response to this, transmission controller 1601 requests modulator 104 to stop generation of the modulation signal and requests image output unit 1402 to stop the output of output image 1500.

This configuration allows display device 1600 to know that the reception terminal has correctly completed the reception of the optical modulation signal and stop the transmission of the optical modulation signal. As a result, display device 1600 is able to prevent transmission of optical modulation signals to unintended reception terminals.

Meanwhile, if timer 1602 has not received notification of the pairing completion from Bluetooth communication unit 1603 despite the elapsed time measured by the timer exceeding a predetermined length of time, timer 1602 determines that the optical modulation signal has not been properly transmitted and received. Timer 1602 also transmits a request signal to transmission controller 1601 to ask for a change of the method for optical modulation signal transmission. In response to reception of the request signal for a change of the method for optical modulation signal transmission from timer 1602, transmission controller 1601 requests image output unit 1402 to change the output image. As an example of the changed output image, output image 1700 shown in FIG. 17 may be used. Output image 1700 is an image that includes high-brightness zone 1701 and low-brightness zone 1702. High-brightness zone 1701 in a middle of the image is wider than high-brightness zone 1501 of output image 1500.

This configuration allows display device 1600 to transmit an optical modulation signal with increased intensity to the reception terminal and thus improve likelihood of the reception terminal properly receiving the optical modulation signal.

Figure 18:
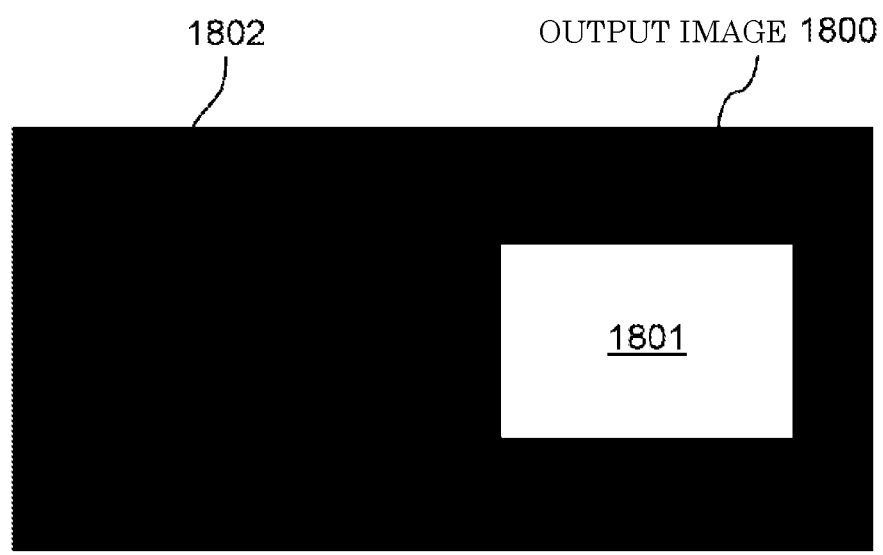
FIG. 18 is a drawing illustrating an example of an output image according to the third exemplary embodiment.

As an image output from image output unit 1402, output image 1800 shown in FIG. 18 may be used. Output image 1800 is an image that includes high-brightness zone 1801 and low-brightness zone 1802. High-brightness zone 1801 is positioned not in a middle of the output image but on a right side. Even if imaging unit 301 of reception terminal 300 images an area other than a middle zone on the display of display device 1600, such as a right side, display device 1600, owing to use of output image 1800, is able to transmit an optical modulation signal to imaging unit 301 of reception terminal 300. A situation in which imaging unit 301 of reception terminal 300 images an area other than the middle zone on the display of display device 1600 can, for example, occur when an orientation of imaging unit 301 of reception terminal 300 sways due to camera shake by user 200.

The image output from image output unit 1402 may be an image that has a high-brightness zone on a left side or in an upper or lower part of the output image, for example, other than output images 1700 and 1800 described above as examples of the image.

Fourth Exemplary Embodiment

A fourth exemplary embodiment will now be described with reference to FIGS. 19 and 20. In the following description, components that have already been described will be denoted by the same numerals or symbols, and descriptions thereof will be omitted.

[4-1. Configuration]

Figure 19:
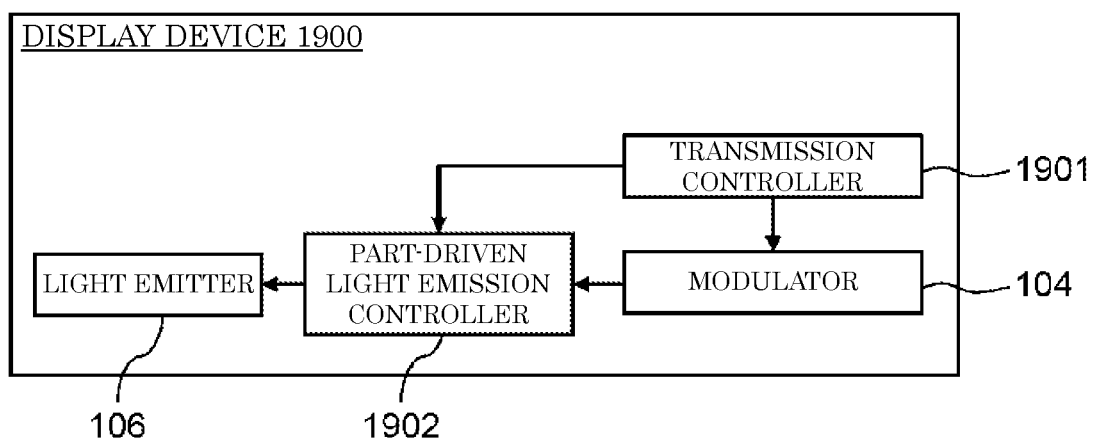
FIG. 19 is a block diagram illustrating a configuration of display device 1900 according to a fourth exemplary embodiment.

FIG. 19 is a block diagram illustrating a configuration of display device 1900 according to a fourth exemplary embodiment. Display device 1900 includes transmission controller 1901, part-driven light emission controller 1902, modulator 104, and light emitter 106.

Transmission controller 1901 controls start and stop of transmission of optical modulation signals. Transmission controller 1901 also controls operation of part-driven light emission controller 1902 depending on whether or not an optical modulation signal is transmitted.

Part-driven light emission controller 1902 is a light emission controller designed to partially drive a backlight for a display panel incorporated in display device 1900. In other words, part-driven light emission controller 1902 is able to control emission of light that varies from one part to another of the display panel. This enables control of light emission, in response to a request from an outside, such that a part of the display panel emits light containing an optical modulation signal and a remaining part of the display panel emits light containing no optical modulation signal.

[4-2. Operation]

While display device 1900 is transmitting no optical modulation signal, part-driven light emission controller 1902 lets a front face of the display panel emit light containing no optical modulation signal.

While display device 1900 is transmitting an optical modulation signal, transmission controller 1901 controls light emitter 106 through part-driven light emission controller 1902 as described below.

First, when display device 1900 starts transmitting an optical modulation signal, transmission controller 1901 requests modulator 104 to generate a modulation signal containing predetermined data. In conformance with the request from transmission controller 1901, modulator 104 modulates a series of information containing the predetermined data into a pulse train and sends the pulse train to part-driven light emission controller 1902. Light emission controller 1901 sends a signal to part-driven light emission controller 1902 to specify a part of the display panel that outputs optical modulation signals. Part-driven light emission controller 1902 controls only a part of light emitter 106 specified by light emission controller 1901 in accordance with the modulation signal sent from modulator 104. Because of this, light emitted from the part of light emitter 106 specified by transmission controller 1901 has an optical intensity proportional to the train of pulses that make up the modulation signal and light emitted from the other part of the light emitter has an optical intensity containing no modulation signal component. As a result, only the part of light emitter 106 emits optical modulation signals.

Figure 20:
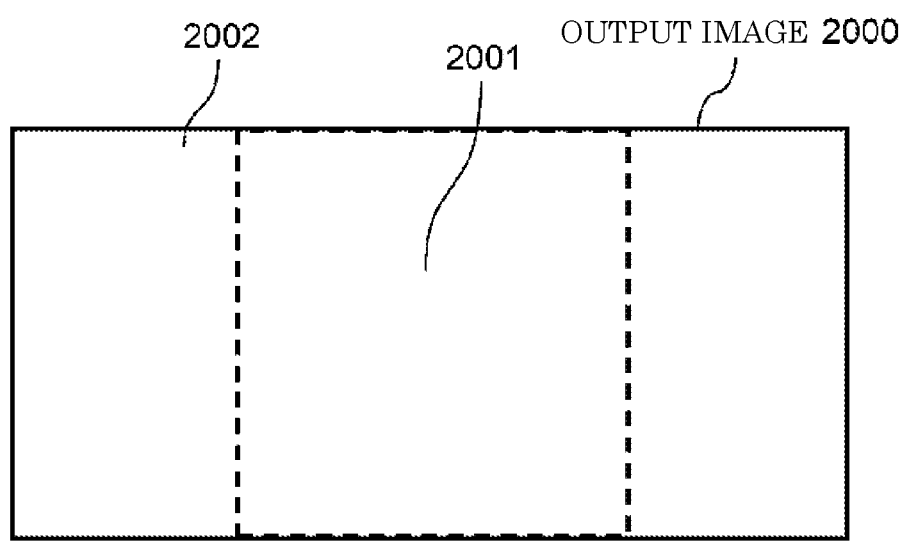
FIG. 20 is a drawing illustrating an example of an output image according to the fourth exemplary embodiment.

FIG. 20 illustrates an example of a result of light emission controlled by part-driven light emission controller 1902. Output image 2000 includes middle zone 2001 and peripheral zone 2002. Middle zone 2001 is a zone from which light containing an optical modulation signal is emitted. Peripheral zone 2002 is a zone from which light containing no optical modulation signal is emitted. This configuration allows the optical modulation signal to be transmitted to only a reception terminal of a user that can image the middle zone of output image 2000. Meanwhile, the display device is able to limit to transmit optical modulation signals to a reception terminal that images the peripheral zone of output image 2000 rather than the middle zone of output image 2000. Such reception terminal is positioned at, for example, a seat adjacent to the seat at which display device 1900 is installed.

[4-3. Effects and Others]

As described above, in the present exemplary embodiment, display device 1900 includes transmission controller 1901 and part-driven light emission controller 1902 and thus can limit the range within which the optical modulation signal reaches.

This configuration allows display device 1900 to prevent transmission of optical modulation signals to unintended reception terminals.

Fifth Exemplary Embodiment

A fifth exemplary embodiment will now be described with reference to FIG. 21. In the following description, components that have already been described will be denoted by the same numerals or symbols, and descriptions thereof will be omitted.

[5-1. Configuration]

Figure 21:
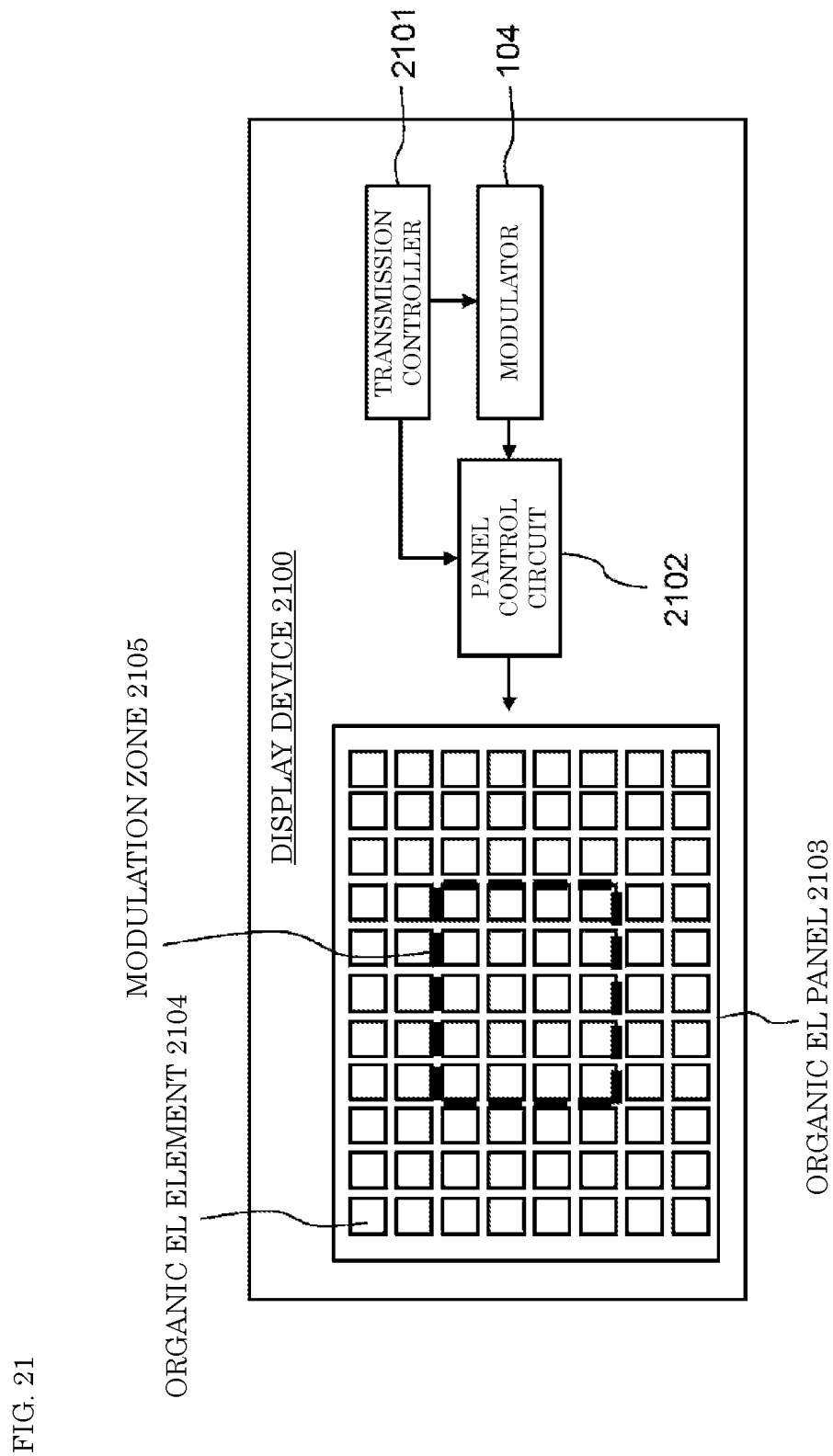
FIG. 21 is a block diagram illustrating a configuration of display device 2100 according to a fifth exemplary embodiment.

FIG. 21 is a block diagram illustrating a configuration of display device 2100 according to a fifth exemplary embodiment. Display device 2100 is a display using organic EL technology. Display device 2100 includes transmission controller 2101, modulator 104, panel control circuit 2102, and organic EL panel 2103.

Organic EL panel 2103 has organic EL elements 2104 as many as a number of pixels. Organic EL elements 2104 each emit light to create a display image. A method for controlling emission of light from organic EL elements 2104 depends on a configuration of panel control circuit 2102. Organic EL elements 2104 may be individually controlled, or the plurality of organic EL elements 2104 may be formed into groups and be controlled in units of groups. In any of these cases, panel control circuit 2102 can control the emission of light from organic EL panel 2103 part by part.

Transmission controller 2101 controls start and stop of transmission of optical modulation signals. Transmission controller 2101 also controls operation of panel control circuit 2102 depending on whether or not an optical modulation signal is transmitted. Specifically, the panel control circuit specifies a combination of organic EL elements 2104 that output optical modulation signals from organic EL panel 2103.

[5-2. Operation]

While display device 2100 is transmitting no optical modulation signal, panel control circuit 2102 controls organic EL panel 2103 such that every organic EL element 2104 emits light containing no optical modulation signal.

While display device 2100 is transmitting an optical modulation signal, transmission controller 2101 controls organic EL elements 2104 through panel control circuit 2102 as described below.

First, when display device 2100 starts transmitting an optical modulation signal, transmission controller 2101 requests modulator 104 to generate a modulation signal containing predetermined data. In conformance with the request from transmission controller 2101, modulator 104 modulates a series of information containing the predetermined data into a pulse train and sends the pulse train to panel control circuit 2102. Transmission controller 2101 sends a signal to panel control circuit 2102 to specify a combination of organic EL elements 2104 that output optical modulation signals. In other words, transmission controller 2101 specifies a partial zone in organic EL panel 2103. Panel control circuit 2102 controls light emission of only organic EL elements 2104 in the zone specified by transmission controller 2101 in accordance with the modulation signal sent from modulator 104. Because of this, light emitted from the zone, which is specified by transmission controller 2101, in organic EL panel 2103 has an optical intensity proportional to the train of pulses that make up the modulation signal and the other zone in the organic EL panel has an optical intensity containing no modulation signal component. As a result, only the partial zone in organic EL panel 2103 emits optical modulation signals.

In one example, only a middle of organic EL panel 2103, such as modulation zone 2105 in FIG. 21, transmits optical modulation signals. This configuration allows the optical modulation signal to be transmitted to only a reception terminal of a user that can image modulation zone 2105 of organic EL panel 2103. Meanwhile, the display device is able to limit to transmit optical modulation signals to a reception terminal that images other than modulation zone 2105 of organic EL panel 2103 rather than modulation zone 2105. Such reception terminal is positioned at, for example, a seat adjacent to the seat at which display device 2100 is installed.

[5-3. Effects and Others]

As described above, in the present exemplary embodiment, display device 2100 includes transmission controller 2101, panel control circuit 2102, and organic EL panel 2103 and thus can limit the range within which the optical modulation signal reaches.

This configuration allows display device 2100 to prevent transmission of optical modulation signals to unintended reception terminals.

Sixth Exemplary Embodiment

A sixth exemplary embodiment will now be described with reference to FIGS. 22A and 22B.

[6-1. Configuration]

Figure 22A:
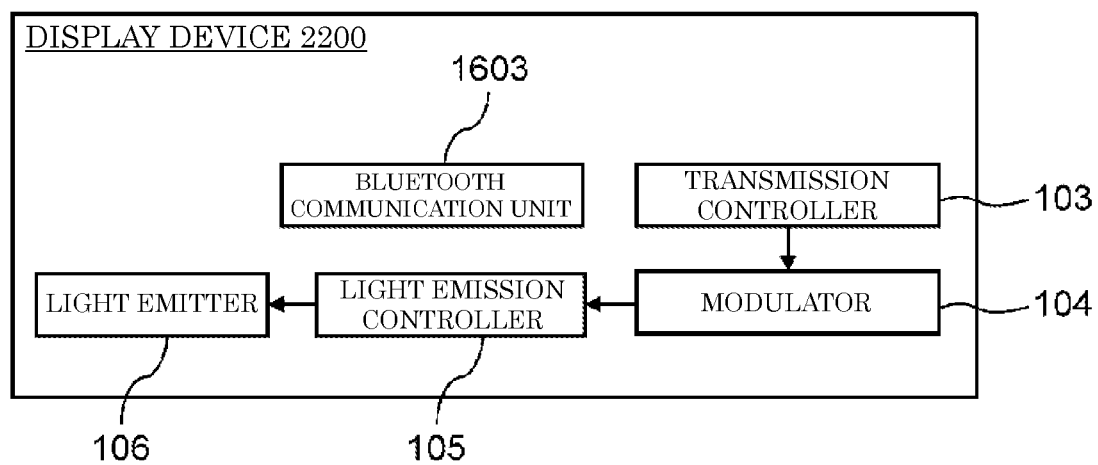
FIG. 22A is a block diagram illustrating a configuration of display device 2200 according to a sixth exemplary embodiment.
Figure 22B:
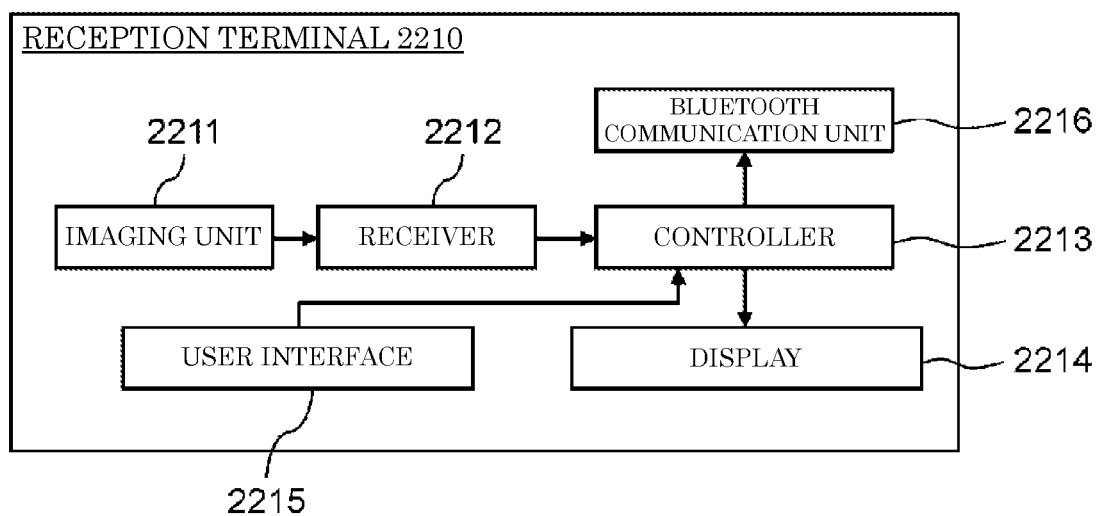
FIG. 22B is a block diagram illustrating a configuration of a reception terminal according to the sixth exemplary embodiment.

FIGS. 22A and 22B are block diagrams illustrating configurations of display device 2200 and reception terminal 2210 respectively according to a sixth exemplary embodiment. Display device 2200 includes transmission controller 103, modulator 104, light emission controller 105, light emitter 106, and Bluetooth communication unit 1603. Reception terminal 2210 includes imaging unit 2211, receiver 2212, controller 2213, display 2214, user interface 2215, and Bluetooth communication unit 2216.

Imaging unit 2211 is a camera that images a subject and generates a captured image.

Receiver 2212 extracts an optical modulation signal contained in the captured image to demodulate the optical modulation signal. Thus, the receiver receives transmission data containing predetermined data described later.

Controller 2213 sends a part of the transmission data to display 2214 and another part of the transmission data to Bluetooth communication unit 2216.

Display 2214 is a display or another device that shows information externally.

User interface 2215 is a device that accepts user input.

Bluetooth communication unit 2216 is a module used to perform Bluetooth communication.

[6-2. Operation]

A description will be given below of operations of display device 2200 and reception terminal 2210 configured as described above. First, the operation of display device 2200 will be described.

Transmission controller 103 of display device 2200 transmits a request signal to modulator 104 to ask for the start of generation of a modulation signal containing predetermined data. In response to the request signal from transmission controller 103, modulator 104 generates a modulation signal by modulating the predetermined data into a pulse train. The predetermined data includes a series of information unique to each display device, a control signal used to inform reception terminal 300 about information such as start and end of optical modulation signal transmission and an amount of transmission data, a redundant signal used to detect or correct an error, a control signal used for pulse train synchronization, and flight-related information such as a seat number, a flight number, and an airline. The predetermined data further includes information (communication information) necessary to enable pairing with Bluetooth communication unit 1603 of display device 2200. Modulator 104 transmits the generated modulation signal to light emission controller 105.

In accordance with the modulation signal sent from modulator 104, light emission controller 105 controls driving of light emitter 106. Light emission controller 105 performs control so as to let light emitter 106 emit light when pulses that make up the modulation signal are high and let light emitter 106 turn off light when pulses that make up the modulation signal are low. Because of this, light emitted from light emitter 106 has an optical intensity in proportion to a train of pulses that make up the modulation signal. As a result, an optical modulation signal is sent from light emitter 106.

The operation of reception terminal 2210 will now be described. Imaging unit 2211 of reception terminal 2210 generates a captured image containing light emitter 106 of display device 2200 and sends the captured image to receiver 2212. Receiver 2212 extracts an optical modulation signal contained in the captured image and demodulates the optical modulation signal. Receiver 2212 sends transmission data acquired through the demodulation to controller 2213. Controller 2213 shows only information (control information) related to the user out of the transmission data on display 2214. The information related to the user, for example, includes a seat number for the seat at which display device 2200 is installed.

The user checks the seat number shown on display 2214 of reception terminal 2210. If the seat number matches a seat number assigned to the user, the user, by operating user interface 2215, inputs a fact that the seat number has been confirmed. In response to this, user interface 2215 sends notification of the confirmation of the seat number by the user to controller 2213. In response to the notification of the confirmation of the seat number by the user, controller 2213 sends Bluetooth communication unit 2216 information (communication information) that is contained in the transmission data and that is needed to pair Bluetooth communication unit 2216 with Bluetooth communication unit 1603 of display device 2200. In other words, controller 2213 determines whether or not the information (control information) related to the user is correct and only if the information is correct, the controller notifies Bluetooth communication unit 2216 of the information (communication information) needed to enable pairing with Bluetooth communication unit 1603. Bluetooth communication unit 2216 then starts a procedure for pairing with Bluetooth communication unit 1603 of display device 2200 by using the communication information.

[6-3. Effects and Others]

As described above, in the present exemplary embodiment, reception terminal 2210 is able to show the user the number of the seat at which display device 2200 is installed and start pairing with display device 2200 when receiving confirmation by the user that the seat number is correct. In other words, because of this, controller 2213 can prevent display device 2200 and reception terminal 2210 from being unintentionally paired with each other. This configuration allows display device 2200 to avoid pairing with reception terminals of users who are sitting on seats other than the seat equipped with display device 2200.

Other Exemplary Embodiments

The first to sixth exemplary embodiments have been described above to exemplify the technique disclosed in the present application. However, applications of the technique of the present disclosure are not limited to the above exemplary embodiments, and the technique can also be applied to embodiments in which change, substitution, addition, omission, and the like are performed. Further, components described in the first to sixth exemplary embodiments may be combined to make new exemplary embodiments.

Since the above-described exemplary embodiments are for exemplifying the technique of the present disclosure, various modifications, replacements, additions, and omissions can be made within the scope of the claims or their equivalents.

INDUSTRIAL APPLICABILITY

The present disclosure can be applied to a display device having a function of transmitting an optical modulation signal to a reception terminal of a user. Specifically, the present disclosure can be applied to display devices such as seat monitors, retractable monitors, and wall mounted monitors installed in airplane cabins.

REFERENCE MARKS IN THE DRAWINGS

100, 600, 900, 1100, 1300, 1400, 1600, 1900, 2100, 2200: display device
101, 301, 2211: imaging unit
102, 601, 901: image recognizer
103, 1101, 1301, 1401, 1601, 1901, 2101: transmission controller
104: modulator
105: light emission controller
106: light emitter
200: user
300, 2210: reception terminal
400, 500, 700, 800, 1000: captured image
1102: viewing angle control filter
1200: viewing angle
1201, 1202: other user
1402: image output unit
1500, 1700, 1800, 2000: output image
1501, 1701, 1801: high-brightness zone
1502, 1702, 1802: low-brightness zone
1602: timer
1603, 2216: Bluetooth communication unit
1902: part-driven light emission controller
2001: zone from which light containing optical modulation signal is emitted
2002: zone from which light containing no optical modulation signal is emitted
2102: panel control circuit
2103: organic EL panel
2104: organic EL element
2105: modulation zone

The invention claimed is:

1. A display device configured to display an image captured by a camera of a reception terminal, the display device comprising:
   a display including a light emitter configured to transmit an optical modulation signal, the optical modulation signal being transmitted by the light emitter emitting light in accordance with a pulse train obtained by modulating predetermined data; and
   a controller that controls output to the display to let a specific image be output to the display during transmission of the optical modulation signal by the light emitter,
   wherein the specific image includes a middle zone and a peripheral zone,
   the middle zone of the specific image is output at a position corresponding to a direction of the camera of the reception terminal, such that the camera of the reception terminal can image the middle zone, and
   the light emitter is configured to transmit the optical modulation signal such that (i) the optical modulation signal is transmitted to the reception terminal, which images the middle zone of the specific image, and (ii) the optical modulation signal is not transmitted to another reception terminal, which does not image the middle zone of the specific image.

2. The display device according to claim 1, wherein a brightness of the middle zone of the specific image is greater than a brightness of the peripheral zone of the specific image.

3. The display device according to claim 1, further comprising a timer to measure time that has elapsed from a point of time at which the light emitter starts transmitting the optical modulation signal,
   wherein the controller changes the specific image on condition that the elapsed time measured by the timer exceeds a predetermined length of time.

4. The display device according to claim 3, wherein on condition that the elapsed time measured by the timer exceeds the predetermined length of time, the controller changes the specific image to enlarge the middle zone of the specific image.

5. The display device according to claim 1, further comprising:
   a communication unit to communicate with the reception terminal by a predetermined communication scheme; and
   a timer to measure time that has elapsed from a point of time at which the light emitter starts transmitting the optical modulation signal,
   wherein the controller changes the specific image on condition that communication between the display device and the reception terminal by the communication unit is not established and that the elapsed time measured by the timer exceeds a predetermined length of time.

6. The display device according to claim 5, wherein on condition that the elapsed time measured by the timer exceeds the predetermined length of time, the controller changes the specific image to enlarge the middle zone of the specific image.

* * * * *